No. 898,008. PATENTED SEPT. 8, 1908.
R. C. SAYER.
VEHICLE AND JUNCTION AND CROSSING THEREFOR.
APPLICATION FILED AUG. 1, 1907.

Witnesses:

Inventor:
R. C. Sayer

UNITED STATES PATENT OFFICE.

ROBERT COOKE SAYER, OF REDLAND, BRISTOL, ENGLAND.

VEHICLE AND JUNCTION AND CROSSING THEREFOR.

No. 898,008.

Specification of Letters Patent.

Patented Sept. 8, 1908.

Application filed August 1, 1907. Serial No. 386,646.

*To all whom it may concern:*

Be it known that I, ROBERT COOKE SAYER, a subject of the King of Great Britain and Ireland, residing at 11 Clyde road, Redland, Bristol, England, have invented certain new and useful Improvements in Vehicles and Junctions and Crossings Therefor; and I do hereby declare the following to be a full, clear, and exact description of the invention, such as will enable others skilled in the art to which it appertains to make and use the same.

The object of the invention is to prevent delay at junctions, crossings, passing places, and other confluences, of road and railway traffic.

The invention essentially consists in separating the branch rails of railway junctions from the main line rails, and working the traffic over them in a manner similar to that for road traffic whereby the main line traffic of both roads and railways is enabled to pass the junctions without stopping; or check, by approach obstructions, or horizontal diversions, or sluing of rails or traffic, or by signals.

The invention further consists in forming the junctions with incline end bars on the ground, and upper rails above the ground suspended from supports beyond the traffic, of wider gage than the cars, carrying stops and crossings, laid to suitable inclines and having overlapping ends.

The cars which leave the main line and cross the junctions have two flanged upper wheels to run on the upper rails, with parts which adapt them to swivel and rotate synchronously and provided with lower wheels to run on the lower rails, or roads.
The upper wheels are carried on mechanism adapted to thrust them in or out to meet the stops and be guided to aline with, alight upon, and rise on the upper rails, or rise and descend on the lower rails and wheels of the car, in a level position, or parallel with the rails, above, or below, the main line cars, and cross over or under them. A wheel or other part is arranged upon the car which when moved laterally is at, or concentric to, the bogie center to bogie with the wheels to meet the inclined bars, rise on them, and put in action the mechanism carrying the upper wheels, so that the wheels may change rails at the crossings to descend, in either position, for the lower wheels to aline with and alight upon the branch rails; and by other similar bars and the said wheels put in action the said mechanism to draw in the upper wheels. The upper and lower wheels are driven together, with motors fixed at the bogie center, or to swivel concentrically to it, to leave a central avenue for passengers to walk throughout the car past the wheels and motors on one, or two covered floors one vertically under the other, that will pass through the railway standard load gage.

The above pointed out objects are attained by the mechanism described in the following specification and are shown in the accompanying drawings, in which,

Figs. 4 and 5 are sections taken at A—A and B—B of Fig. 3. Fig. 8 is a plan of the lower floor of a car; $8^E$ is the upper floor showing the relative position of the parts with the rails straight; the ground rails curved to 40 feet; and the upper rails to 60 feet radii; the two being connected by lines F—F. Fig. 9 is a transverse section taken at F—F of Fig. 8. Fig. $9^a$ is a detail of the tracks $f$, $g$. Fig. 19 is a transverse section of the parts shown at the upper end of Fig. 13 on an enlarged scale. Fig. 21 is an enlarged detail taken at N—N Fig. 19. Fig. 22 is an enlarged section taken at M—M Fig. 24. Fig. 23 is a detail of Fig. 22. Figs. 24 and 25 are sections taken at K—K Fig. 19, and L—L Fig. 24, respectively. Fig. 29 is a section taken at N—N Fig. 19. Figs. 30 and 31 are sections taken at O—O, and at R—R Fig. 29, respectively. Fig. 32 is a developed sectional elevation taken at Q—Q—Q Fig. 29. Fig. 33 is a section taken at S—S Fig. 34.

Figures 1, 2:
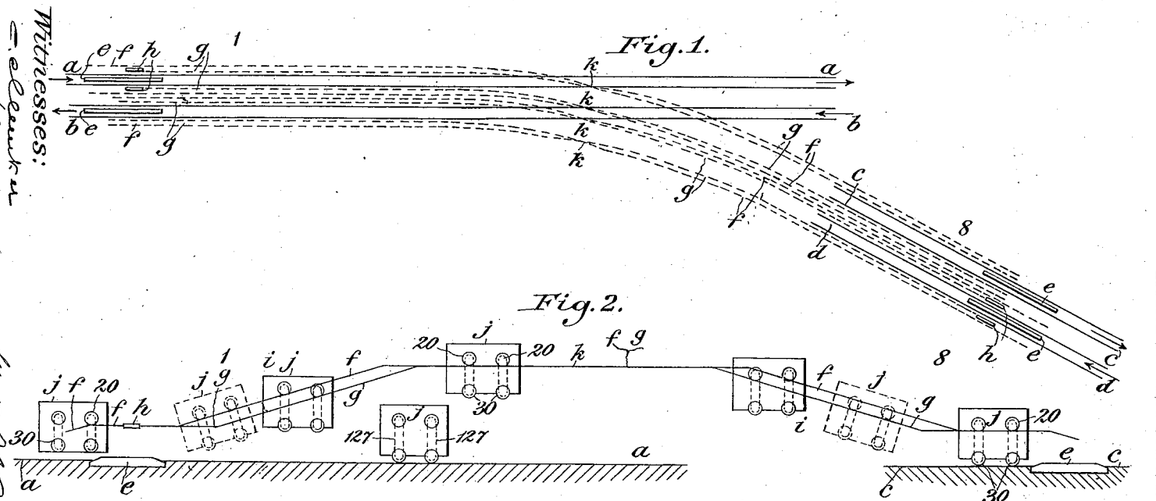
Figure 1 is a diagrammatic plan of a railway double junction illustrative of the invention, and is equally applicable to roads.
Fig. 2 is a longitudinal section of Fig. 1.
Figure 3:
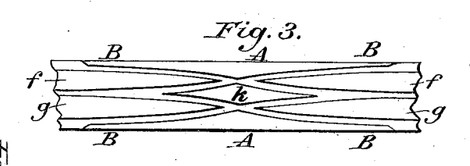
Fig. 3 is a detail of a crossing.
Figure 4:
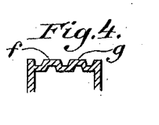
Figure 5:
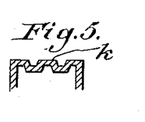
Figure 6:
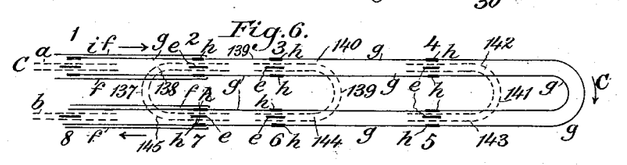
Fig. 6 is a diagrammatic plan of junctions with the upper rails.
Figure 7:
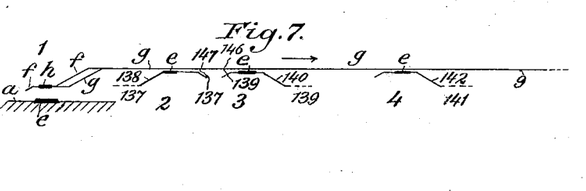
Fig. 7 is a section taken on line C—C of Fig. 6.

In Figs. 1 and 2 the invention is shown adapted to a railway double junction; Figs. 6 and 7 show intermediate junctions with its upper rails. Fig. 6 shows the double terminal junction 1—8 whereby a main line railway, and a branch, as shown in Fig. 1 are connected, having their intermediate connecting suspended rails $f g$ shown which may be constructed as shown or of any suitable form; and together with Fig. 7 have different scales to those of the junctions 1—8, although connected to enable the junctions, 2, 3, 4, 5 6 and 7 to have their connecting circuits complete, and thereby facilitate explanation in connection with Figs. 1 and 2 of the junctions 1, 8 and their details, the cars $j$ being shown in their several positions; which are precluded by the smallness of the scale of the intermediate part of Figs. 6 and 7. It is to be understood that the cars $j$ are adapted to run upon all the rails and junctions, and at the points where the cars $j$ change from or to, the rails $a$ or $c$ and $f$ or $g$, or $g$ and 138 or the like their vertical distance apart is invariably regulated by that of the wheels 20 and 30 of the cars $j$, for the one set to take, by means of the introductory inclines, upon the rails the car is about to be carried upon, before the other set of wheels leave the rails carrying the car $j$. It is also desired to be understood the bars $e$ are not essential to the operation of the invention, but are preferred, to avoid human fallibility.

Figure 8:
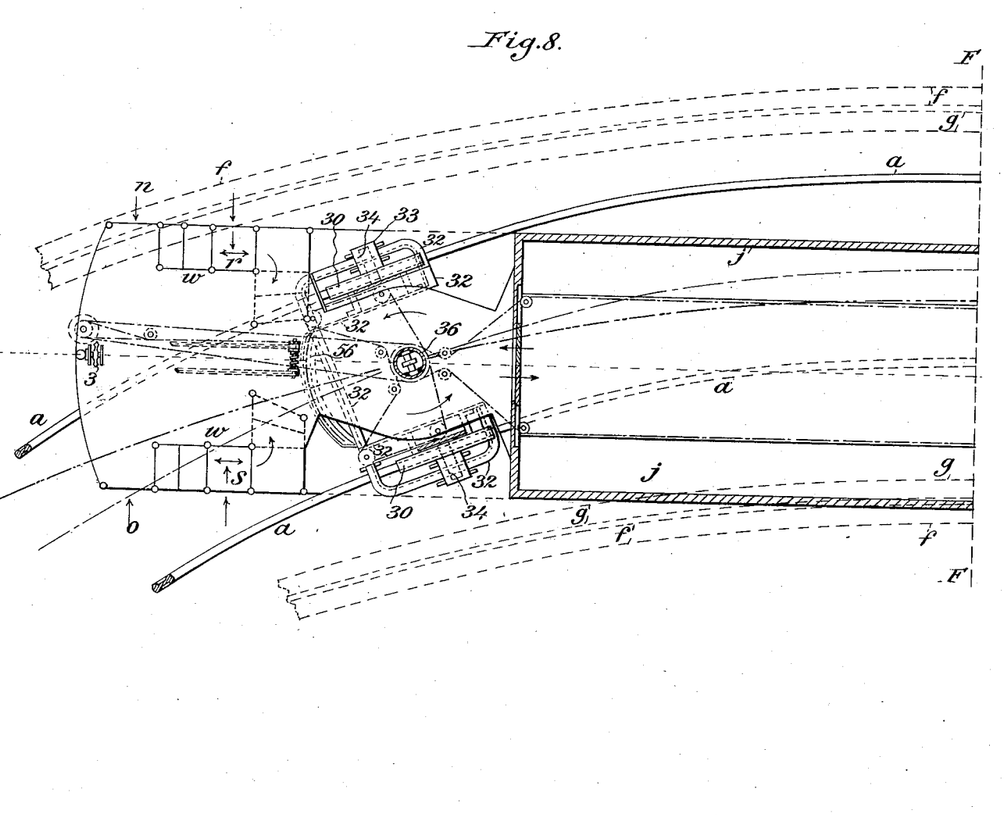
Figures 9, 9A:
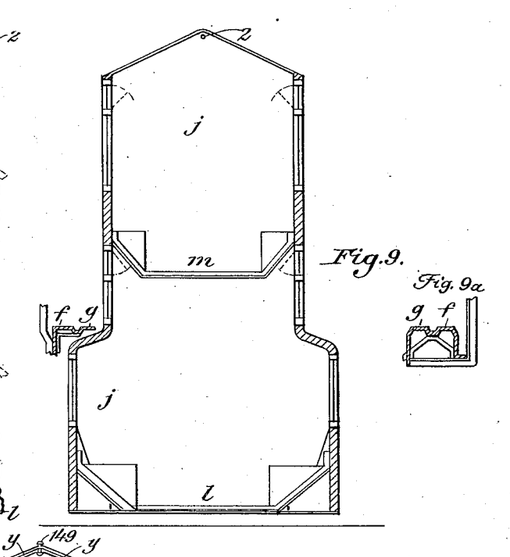
Figure 11:
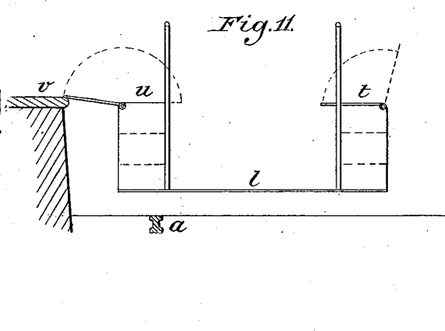
Fig. 11 is a transverse section of a railway platform and car entrance.
Figures 13, 14, 15, 16, 17, 18:
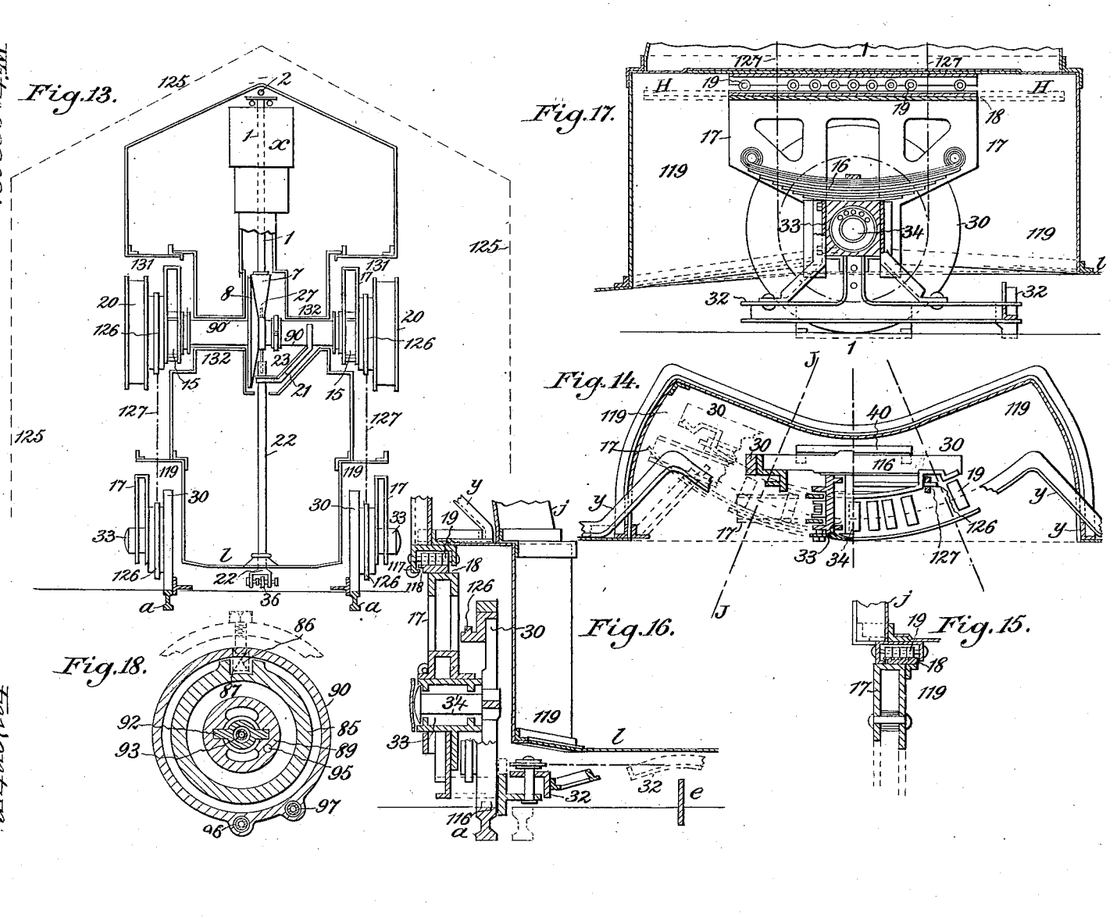
Fig. 13 is a view similar to Fig. 12 with a motor at the bogie center.
Fig. 14 is a sectional elevation taken at H—H Fig. 17.
Figs. 15 and 16 are sectional elevations taken at J—J Fig. 14, and 1—1 Fig. 17, respectively.
Fig. 17 is a section through the bearing of the lower wheel.
Fig. 18 is a section of the axle of a top wheel.
Figure 20:
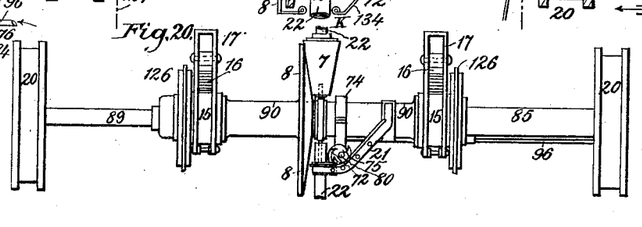
Fig. 20 is an elevation of the axle, and top wheels extended.
Figures 21, 22, 23, 24, 25:
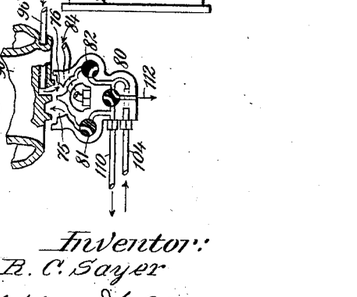

The arrows show the directions of the cars, $a b$ being the "up" and "down" main line rails; $c d$ the "up" and "down" branch rails ending at a distance from $a b$; having bars $e$ with inclined ends. Suspended rails $f g$ are carried on supports outside the traffic, laid above and across the former rails and are provided with suitable inclinations, and are of wider gage than the cars. These rails have stops $h$ and crossings $k$; so that a main line car $j$ on rails on $a$ or $b$ runs through without stopping, or requiring attention on the part of the driver or anyone else. A branch car $j$ on $a$ for $c$; or $d$ for $b$, also runs through without attention, when its regulator before starting, or its driver afterward by hand, actuates a leading wheel 36 laterally, see Fig. 33, to arrange it to meet a bar $e$ on the ground and ride upon it to actuate mechanism, such as the opening of a pressure tap 80 (shown in Fig. 25) to thrust out or extend the trailing top wheels 20 (see Fig. 20), to their full extent before the car reaches rails $f$ or $g$, to cause their flanges to aline with them and their tires to alight on the rail $f$. When a trailing wheel 36 engages the bar $e$ the leading top wheels 20 are similarly thrust out before reaching rails $g$ to engage a stop $h$ (shown in Figs. 1 and 2), adapted to guide them and cause their flanges to aline with and their tires to alight upon rails $g$ and enable the car $j$ to rise on the incline $i$ of the junction 1 in a level position, to a point above the cars $j$ on the rails $a$ or $b$. At the crossings $k$ the wheels 20 run from rails $f$ to $g$ and $g$ to $f$, to enable car $j$ to descend the incline $i$ of the junction 8 level, and the wheels 30 to aline with and alight on the rails C, at which point the wheels 36 meet another bar $e$ and similarly actuate the pressure tap to thrust in the wheels 20 and enable the car $j$ to pass through the load gage 125 (Fig. 13), to a platform $v$, shown in Fig. 11 to load by the steps $w$ of the car $a$ at $r, s, t, u$, Fig. 8, or unload from the floor $l$ to the ground at $n, o, p, q$.

Figure 26:
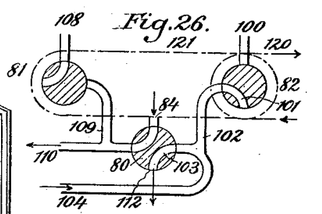
Fig. 26 is a section of the pressure tap in position for a car to run on the main line.
Figure 28:
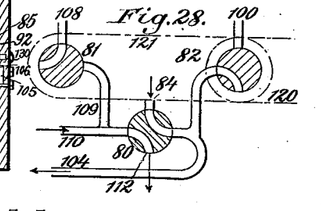
Fig. 28 is a similar view with the parts arrayed for a single car to pass over the junctions in a level position.

A train of cars $j$ coupled together and drawn by one motor car from $a$ to $c$, is carried on one rail $f$ or $g$ at each side; for which the driver actuates the leading wheel 36 and tap 80, as above described, and also, by the straps 120, and 121, Figs. 26 and 28, operates the taps 81 and 82 to cause pressure from 80 to pass through 81 and 82 to thrust out the leading and trailing wheels 20 together to their full extent to aline with, alight upon and traverse the rail $f$ and rise as before described, but parallel with rail $f$, enabling the car couplings to operate as usual. At the crossings $k$ all the wheels 20 change from $b$ to $g$ to descent incline $i$ at junction 8, and the wheels 30 aline with and alight upon rails $c$, and proceed as above described. The cars $j$ may be driven by any power, or drawn, or run by gravity over the junctions, and the wheels 20 projected by any suitable means.

Figure 10:
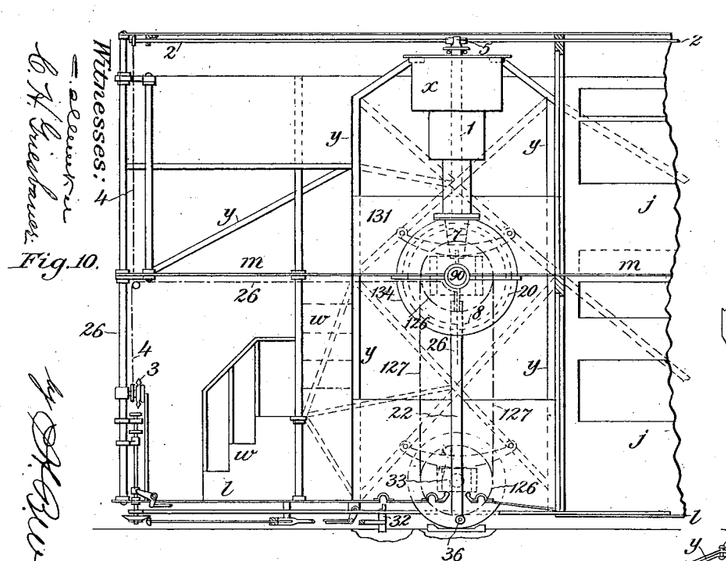
Fig. 10 is a section through Fig. 8. as on a straight rail.
Figures 34, 35, 36:
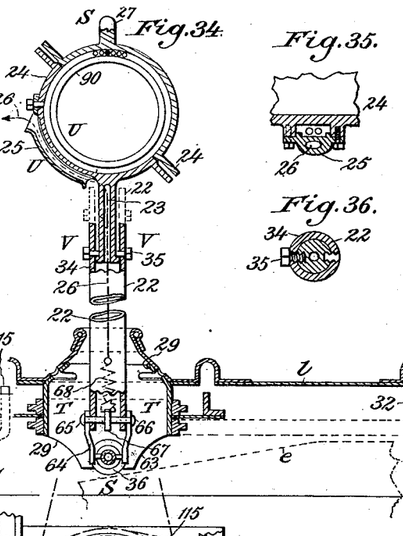
Fig. 34 is a sectional elevation of means for actuating the pressure tap.
Figs. 35 and 36 are sections taken at U—U and V—V Fig. 34, respectively.

The object of this invention is to drive the cars $j$ so that their carrying wheels 20 and 30 shall form a two wheeled lower bogie, and a two wheeled upper bogie adapted to bogie or swivel and be driven synchronously by suitable motors, so disposed as to leave a central avenue for passengers to walk past the wheels and motors on one floor, or on two covered floors vertically over one another; so that the wheels 30 may be retained tangent to the rails, or leave them to run on roads. For this purpose the motor cars are provided with an axle 90 mounted to rotate in bearings 15 (see Figs. 19 and 20) provided with springs 16 having laminæ connected to sleeves 151 to cause them to slide, plates 17 and 18 concentric to the bogie. The plates 18 are ribbed at 13 (see Fig. 21), to carry car $j$ on rollers 19 when the wheels 20 are on the rails $f$ and $g$, (see Figs. 1 to 7, 9, 29 30) and are kept tangent to them by their flanges to cause them to bogie or swivel within the chambers 131. When the car $j$ runs on the wheels 30 (see Figs. 13 to 17), it rests on similar parts that bogie or swivel in the chambers 119, during which time the wheels 20 (Figs. 19 to 21), rest and swivel with wheels 30 on parts 117 and balls 118. The spur wheels 126 on the axle 90 and the pitch strap 127 drive the wheels 20 and 30 (see Figs. 10, 13); and the axle 90 is driven by the arms 21 and shaft 22 which latter is suspended on a hollow pin 23 by a neck 34 and bolts 35 (see Figs. 33 to 37). The lower end of the shaft 22 is forked at 61 and an axle 28 is journaled in said forked end 61 and rises and falls in slots 71 in a drum 29 carried by said shaft 22 and secured by pins 115. A frame 32 (see Figs. 8$^E$, 13 to 17) carries bearings 33 in which the axles 34 of the spur wheels 126 and track wheels 30 are mounted to swivel. The wheels 36 are mounted to rotate on the axle 28 in the central position shown in Fig. 33, in position to ride on the bars 3 shown in dotted lines in Fig. 34, when moved laterally by the pins 63, then the levers 64, shaft 66, lever 67, spring 68, cord 26 connect with said spring and handle 3 (see Fig. 10.)

The axle 90 (shown in Figs. 19, 31, 32 and 38) is carried in its bearings 15 central to the floor $m$, and covered by a casing 134, arranged to bogie or swivel on the car $j$ by wheels 135 and 136 on $m$, in slots 132 which are covered by the shutters 133 to travel on the parts shown. The axle 90 carries the telescopic axle 85 to enable it to slide. The axle 85 carries one of the wheels 20, on which the axle 90 is connected to slide by a key 86, keyway 87, glands 88, and an axle 89. The axle 89 carries the other wheel 20 and the glands 91. The wheel 20 mounted on axle 85 has a hollow key 92 fixed to it (Fig. 18), in which an open ended tube 93 secured to the other wheel 20 passes through a gland 94 connecting by a passage 95 in axle 89 to the space between the axles 85 and 89 and their glands 88 and 91. The hub of wheel 20 mounted on axle 85 carries two similar tubes 96 and 97 (see Figs. 18, 19 and 25). The tube 96 passes through a gland 98 and connects passages 99 and 76 of a ring 74 (Figs. 19 to 25). It also connects passages 100 and 101 of the tap 82 (Figs. 26 to 28), and 102 and 103 of the tap 80; and also passage 104 with similar taps and passages of the axles and wheels 20 at the other end of the car $j$, and with the passage 105 (Fig. 19), and space 106 between the axles 85 and 89 to exhaust it when the wheels 20 are within the car. The tube 97 (Fig. 18), passes through a gland (not shown), and connects the passage 75 of the ring 74, passages 108 and 109 of the tap 81, the tap 80 and by passage 110 with similar passages and taps of the axle 90 and wheels 20 at the other bogie. The taps 80 connect passage 84 with a pressure reservoir, (not shown), and passage 112 to exhaust. The ring bearing 74 is held from turning by the car $j$ and carries the taps 80, 81 and 82 (Figs. 24, 25), on balls. The chambers 75 and 76 are closed by packings 77 and members 78 and 79. The tap 80 has a 90 degree ratchet wheel 73 on its axle (see Figs. 19, 20 and 24) rotated by a spring pawl 72 on the arm 21 on shaft 22 each time the wheel 36 (Figs. 33, 34) rises upon the bars $e$ shown in Fig. 34.

Figure 12:
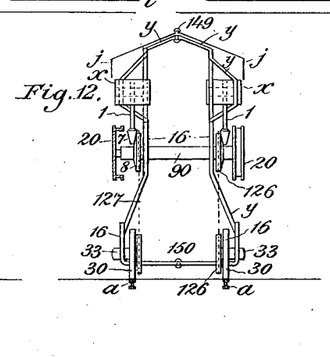
Fig. 12 is a section taken on line G—G of Fig. $8^E$ showing two side motors.

The axles 90, 85 and 89 and wheels 20 and 30 (Fig. 19) and the car $j$ are driven either by side motors $x$ on the frame $y$ (Fig. 12), or by a motor $x$ fixed at the center of the bogie on $y$, by means of its rotor $z$ keyed at 12 to its axle 1 to rotate it, its feathers 9 and 10 adapted to actuate the pressure pump 11 to charge the reservoir by a pipe 83 to thrust wheels 20 and their axles out and in; 1 drives the cone 7, wheel 8, axles 90, 85 and 89, wheels 20 and 30 as above described. The cone and shaft 1 are centered by a pin 27 (Figs. 33, 34), on the ring bearing 24 carrying the pin 23 and a cover 25 supports the cord 26.

Figures 29, 30, 33:
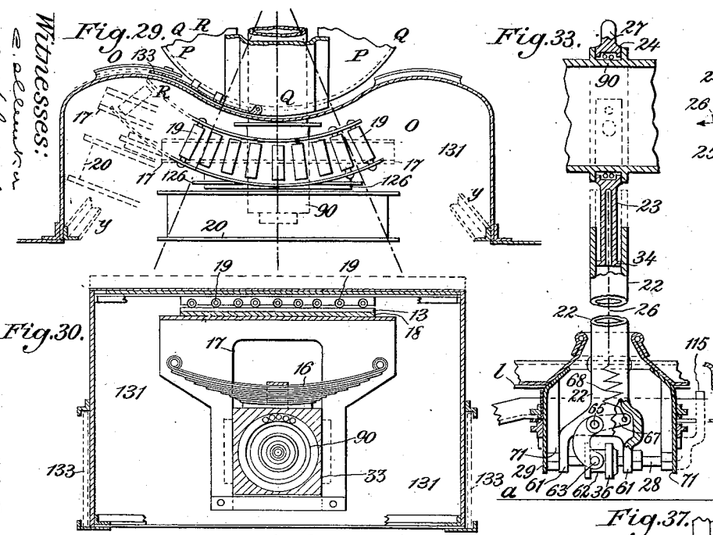
Figures 37, 38:
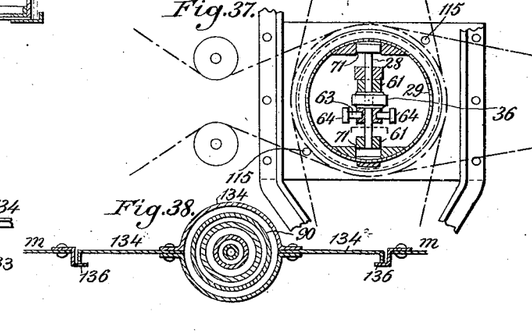
Figs. 37 and 38 are sections taken at T—T Fig. 34; and P—P Fig. 29, respectively.

Operation.—The main line rails $a$ $b$ at the junctions, or confluences of traffis, shown in Figs. 1, 2, 6, 7 are the same, and the cars $j$ run the same as at other parts of a railway; and similarly with roadways. The branch rails $c$ $d$ are stopped clear of $a$ $b$ and the intervening parts have the suspended rails $f$, $g$ carried on supports fixed outside the traffic. The cars $j$ are run by electric motors $x$ arranged at one or both ends, or by other suitable means and the shafts 1 and 22 (Figs. 12, 19) are placed to give a partly or wholly clear avenue for passengers at all times. The motors drive the cone 7, wheel 8, axles 90, 85 and 89, and track wheels 20, spur wheels 126, and straps 127, the track wheels 30 being arranged to traverse the rail or road surface. For a car $j$ to branch off from $a$ to $c$ in a level position the handle 3 (Fig. 11) is turned to actuate the cord 26 (Figs. 33, 34), levers 67 and 64 thrust over the wheels 36 at both ends of car $j$ the leading wheel 36 meets the bar $e$ (Figs. 1, 2, 6 and 7) and thrusts up shaft 22, 21 pawl 72, turns ratchet wheel 73 and the tap 80 ninety degrees from position shown in Fig. 26 to that shown in 28 causing pressure between the axles 85 and 89 the trailing end of the car $j$ holds the wheels 20 in, to exhaust through the passages 95 and 93, key 92, Fig. 19, tube 97 (Fig. 18), chamber 75 (Fig. 22) passage 110, tap 80 and passage 112 (Figs. 25 to 28) and sends pressure by the tubes 84, tap 80, tube 104, passage 76, (Fig. 22), tube 96, (Fig. 19), gland 98, passages 105 and 106 to thrust the axles 85 and 89 and the wheels 20 out the trailing end of the car, to aline with the rails $f$ (Figs. 1, 2) and take upon them. When the trailing wheel 36 meets or comes in contact with the bars e the leading wheels 20 are thrust out to meet the stop h and are guided thereby to the rail g, enabling the car j to run up the incline i of junction 1 with all the wheels 20 level, above the cars j on the rails a and b. At the crossings k (Figs. 3 to 5), the leading wheels turn from rails g to f, and the trailers from rails f to g, to cause the car to descend the incline i of the junction 8 level; before the rails f and g end the wheels 30 take upon the rails c. The flanges of the wheels 50 keep them tangential to rails f and g by traversing their springs 16, plates 17 and 18, bearings 15 and wheels 20 within the chambers 131. The part 134ª of the floor m, plate 134, wheels 135, and parts 136 also swivel on m, axle play being allowed by the slots 132 and the shutter 133, (Figs. 31, 32, 38). The arms 21 (Fig. 19), shaft 22, (Figs. 33 to 37), axle 28, wheel 36 are adapted to slide vertically in slots 71, and give motion to the parts, and to the bearings 33, axle 34, plates 17 and 18 within the chamber 119 when the car runs on the rails a b or roadway. When the wheels 20 are on the rails f g, the wheels 30 are suspended free (Fig. 16) on their axles 34, bearings 33 and parts, as above described by the part 117 and balls 18, (Fig. 12) frame v and sleeves 151 (Fig. 30).

Figure 27:
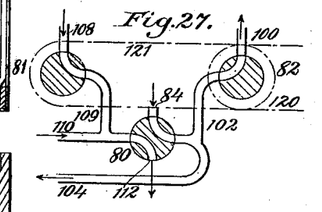
Fig. 27 is a similar view to Fig. 26 with the parts arranged for coupled cars to pass over the junctions parallel with the rails.

When a train of coupled cars j without motors are to be drawn from a to c, the wheel 36 actuates the tap 80 as before described, and the driver by the cords 120, 121 (Figs. 26 to 28) brings the taps 81 and 82 to position shown in Fig. 27, the leading end of car j whereby the trailing axles and their wheels 20 are caused to be thrust out to their full extent by exhausting the retaining pressure and giving pressure to send them out; and the axles and wheels 20 at the leading end are exhausted through the tubes 108 and 110, taps 80 and 81 and receive pressure through passages 84, 80, 82, 100, 104 so that all the wheels 20 are thrust out equally and in unison before reaching the rail f and they aline with and take upon said rail before reaching the rail g, and stops h (Figs. 1 2,). The coupled cars j then rise on the incline i and rails f parallel to them, their haulage, brake and other couplings, acting as usual. At the crossings k all the wheels 20 are diverted from rails f to rails g to descend the incline i junction 8 parallel with rails g to cause their wheels 30 to aline with and alight on the rails c; the wheels 36 come in contact with and ride on bars e and turn the tap 80 ninety degrees to position shown in Fig. 26 to reverse the exhaust and supply pressure; the taps 81 and 82 being retained as shown in Fig. 27, whereby the wheels 20 are all thrust within the car.

At junctions with suspended rails as shown in Figs. 6 and 7, a car j having ascended the incline i, junction 12, on either, or both rails, f and g proceeds to junction 2, its wheels 30 alighting upon the rails 137 of the incline 138 raise the flanges of 20 above the rails f g. The leading wheel 36 then meets the bar e, turns the tap 80, thrusts in the trailing wheels 20 that were on rails f to meet the stops h, whereby they are stopped and guided over the rails g. The stops h also hold the leading wheels 20 in place. The car then proceeding on the wheels 30 and rails 137 descends the incline 147, whereby all the wheels 20 are caused to alight on the rails g before 137 end, to reach the junction 3, where the wheels 30 meet and rise on the rails 139, and the operations described relative to junction 2 are repeated, all the wheels 20 being withdrawn within the car j to cause it to descend the incline 140 on the wheels 30 and rails 139, and make a circuit of any extent as shown in dotted lines, pass under rail g, rise on the incline 144 at junction 6, parallel to the rails g; the wheels 36 then meet bar e, actuate tap 80, thrusts out the wheels 20 to the stops h, and descending the incline pairing with 146 (Fig. 7) on the wheels 30, the wheels 20 having alined with alight on the rails g, and proceed to junction 7, or other similar junctions.

I claim as my invention:—

1. In an apparatus for enabling the main line traffic of both roads and railways to pass junctions without stopping, or interference, the combination of junctions provided with inclined bars disposed on the ground, rails suspended above the ground beyond the traffic and of wider gage than the cars designed to travel thereon, stops and crossings carried by said suspended rails and laid to suitable inclines and having overlapping ends.

2. In an apparatus for enabling the main line traffic of both roads and railways to pass junctions without stopping, or interference, the combination of junctions provided with inclined bars disposed on the ground, rails suspended above the ground beyond the traffic and of wider gage than the cars designed to travel thereon, stops and crossings carried by said suspended rails and laid to suitable inclines and having overlapping ends, intermediate junctions with the upper rails having similar parts, branch rails arranged below the upper rails, cars to cross said junctions having lower wheels to run on the lower rails, flanged upper wheels to run on the upper rails, with means for causing them to bogie or swivel and rotate synchronously with said lower wheels, said upper wheels having mechanism adapted to thrust them in or out to engage said stops on the upper rails and be guided thereby to cause said upper wheels to aline with, alight upon, and run on the upper rails, or to rise and descend on the lower rails and wheels of the car in a level position, or parallel to the rails, to above or below the main line cars, and cross over or under them.

3. In an apparatus for enabling the main line traffic of both roads and railways to pass junctions without stopping, or interference, the combination of junctions provided with inclined bars disposed on the ground, rails suspended above the ground beyond the traffic and of wider gage than the cars designed to travel thereon, stops and crossings carried by said suspended rails and laid to suitable inclines and having overlapping ends, intermediate junctions with the upper rails having similar parts, branch rails arranged below the upper rails, cars to cross said junctions having lower wheels to run on the lower rails, flanged upper wheels to run on the upper rails, with means for causing them to bogie or swivel and rotate synchronously with said lower wheels, said upper wheels having mechanism adapted to thrust them in or out to engage said stops on the upper rails and be guided thereby to cause said upper wheels to aline with, alight upon, and run on the upper rails, or to rise and descend on the lower rails and wheels of the car in a level position, or parallel to the rails, to above or below the main line cars, and cross over or under them, a member carried by the car which when moved laterally is at, or concentric to, the bogie center to bogie with the wheels to engage the inclined bars, rise on them, and put in action the thrusting mechanisms of the upper wheels to cause the wheels to change rails at the crossings and to descend in either position for the wheels to aline with and alight upon said branch rails, and means operable to draw in the upper wheels.

4. In an apparatus for enabling the main line traffic of both roads and railways to pass junctions without stopping, or interference, the combination of junctions provided with inclined bars disposed on the ground, rails suspended above the ground beyond the traffic and of wider gage than the cars designed to travel thereon, stops and crossings carried by said suspended rails and laid to suitable inclines and having overlapping ends, intermediate junctions with the upper rails having similar parts, branch rails arranged below the upper rails, cars to cross said junctions having lower wheels to run on the lower rails, flanged upper wheels to run on the upper rails, with means for causing them to bogie or swivel and rotate synchronously with said lower wheels, said upper wheels having mechanism adapted to thrust them in or out to engage said stops on the upper rails and be guided thereby to cause said upper wheels to aline with, alight upon, and run on the upper rails, or to rise and descend on the lower rails and wheels of the car in a level position, or parallel to the rails, to above or below the main line cars, and cross over or under them, means for driving the upper and lower wheels together, motors arranged at the bogie center to leave a central avenue for passengers to walk throughout the car.

5. The combination with a railway junction consisting of main line rails, and branch rails separated therefrom, rails arrayed above, below and between, the main line and branch rails, stops, crossings and incline ended bars arrayed parallel and central to the rails, of a car fitted with means operable when crossing the junction to cause the upper wheels of said car to be projected to run upon the upper rails, or withdrawn, for its lower wheels to run on the lower rails level with one another, or parallel to the rails.

6. The combination with a railway arranged above the ground, of a junction consisting of main line rails for upper wheels arrayed on a car to run upon, stops to guide said wheels, branch rails arrayed below the main line rails with incline ended bars parallel and central thereto and disposed at heights and inclinations for the lower wheels of the car to raise the upper wheels above their rails, to cause them to be thrust out or in, and admit the car to traverse an incline, and circuit and inversely return to the main line rails by a similar junction.

In testimony whereof I have affixed my signature, in presence of two witnesses.

ROBERT COOKE SAYER.

Witnesses:
E. M. TOLERTON,
G. T. PITCHER.